United States Patent [19]

Kim

[11] Patent Number: 5,497,207
[45] Date of Patent: Mar. 5, 1996

[54] OVERHEAD PROJECTOR

[75] Inventor: Hoo-shik Kim, Kyungki-do, Rep. of Korea

[73] Assignee: Samsung Aerospace Industries, Ltd., Changwon, Rep. of Korea

[21] Appl. No.: 297,617

[22] Filed: Aug. 29, 1994

[30] Foreign Application Priority Data

Aug. 31, 1993 [KR] Rep. of Korea ............... 93-17558

[51] Int. Cl.$^6$ .................................................. G03B 21/28
[52] U.S. Cl. ......................... 353/66; 353/DIG. 4; 353/65
[58] Field of Search .................................. 353/65, 66, 63, 353/DIG. 4, 122; 359/72

[56] References Cited

U.S. PATENT DOCUMENTS 5,214,457  5/1993  Takanashi et al. ................. 353/31
5,231,433  7/1993  Yoshida et al. ..................... 353/64
5,325,137  6/1994  Konno et al. ....................... 353/63
5,414,481  5/1995  Fujioka et al. ................. 353/DIG. 3

*Primary Examiner*—William C. Dowling
*Attorney, Agent, or Firm*—Morgan & Finnegan

[57] ABSTRACT

An overhead projector that irradiates light onto an object or a sheet of paper, focuses the light reflected therefrom with a focusing lens, isolates ultraviolet or infrared rays having a specific wavelength among the focused light via a filter, forms an image by irradiating the isolated light onto an image former, and projects the image onto a projection screen by irradiating visible light onto the image former whereby the image is enlarged and projected via a projection lens to thereby obtain a more clear image.

17 Claims, 2 Drawing Sheets

OVERHEAD PROJECTOR

BACKGROUND OF THE INVENTION

The present invention relates to an overhead projector, and more particularly, to an overhead projector which initially forms an image corresponding to an object or the contents of a sheet of paper by employing a specific wavelength and enlarges the image without affecting the projected image.

In general, an overhead projector is used to project an enlarged image recorded on a film onto a projection screen. FIG. 1 shows a conventional overhead projector 10 which includes a case 12 whose upper surface comprises a Fresnel lens 11, a mirror 14 installed in an interior of case 12 by a predetermined angle and which faces Fresnel lens 11, an optical source 15 installed in one side of an interior of case 12 and which irradiates light onto mirror 14, a focusing lens 13 installed between optical source 15 and mirror 14, an image forming lens group 17 located above Fresnel lens 11 and supported by a support 16 fixed to one side of case 12, and a reflection mirror 18 installed on an optical axis of image forming lens group 17.

When the conventional overhead projector 10 is used, a film 100, having a predetermined image printed thereon is placed on Fresnel lens 11 at the state where light is irradiated from optical source 15. The light irradiated from optical source 15 is reflected onto mirror 14 and changed into focusing light while passing through Fresnel lens 11. Then, the light changed into focusing light passes through film 100 and is irradiated onto a screen via image forming lens group 17, thereby obtaining an enlarged image.

The conventional overhead projector 10 has an advantage in that the image formed on a screen is clear and illuminance is high. However, actual objects and the contents of a sheet of paper cannot be used directly, which means that an additional film has to be prepared. When the film 100 is prepared, the projection process is simple. However, since the film 100 has to be of a size corresponding to the contents of paper, it is difficult to enhance optical efficiency. Optical efficiency can be achieved via the use of a larger Fresnel lens, but this increases manufacturing costs significantly.

For another conventional projector 10' attempting to solve the above-described problem, as shown in FIG. 2, an image forming lens group 22 is installed at one side of case 21 and a mirror 23 is installed at a predetermined angle in an interior of case 21 facing the image forming lens group 22. A transparent supporting plate 24 is provided at the upper surface of case 21 so as to support the paper 100, and a plurality of optical sources 25 that irradiate light onto paper 100 supported by supporting plate 24 are installed within case 21.

For the conventional overhead projector 10' of FIG. 2, when the light is irradiated from optical source 25 onto paper 100, the light is reflected from the paper. The reflected light is reflected onto mirror 23, and thus, an enlarged image is formed onto a projection screen via image forming lens group 22.

However, the conventional projector 10' has certain problems.

First, the reflectance of the light irradiated from optical source 25 onto paper 100 and reflected from the paper 100 is approximately 17%. Therefore, a strong optical source is needed in order to obtain a clear image, which causes problems in terms of radiation and the power supply required.

Second, since the surface illuminance of the paper 100 supported by the supporting plate 24 is poor, the light irradiated from an optical source 25 is irregularly reflected and thus results in a small amount of usable light. Therefore, light from an extremely strong optical source has to be irradiated onto the paper or object.

Third, since a high luminance optical source and facilities therefor are needed, the size and price of an overhead projector containing the same are increased accordingly.

SUMMARY OF THE INVENTION

Accordingly, it is an object of the present invention to provide an overhead projector which projects an image initially formed by reflection from the paper onto a projection screen so as to obtain a clear image.

It is another object of the present invention to provide an overhead projector for greatly improving the efficiency of the optical source which can thus be miniaturized.

To accomplish the above and other objects, there is provided an overhead projector including a first illuminating source for irradiating light having a predetermined wavelength onto an object placed on a planar surface, a focusing lens group for focusing the light irradiated by the first illumination source that is reflected from the object, a first isolating filter for passing a specific wavelength component of the light reflected from the object being incident from the focusing lens group, and for reflecting the light from the object not having the specific wavelength at a predetermined angle, an image forming member for initially forming an image of the object by a photosensitive reaction by employing the light having a specific wavelength which has passed the first isolating filter, a second illuminating source for irradiating illuminance light including a visible light component, a second isolating filter for reflecting the visible light component of the illuminance light irradiated from the second illuminating source onto the image forming mender, and for removing the specific wavelength component, a reflection member for reflecting at a predetermined angle the image projected from said image forming member by the visible light component irradiated from the second isolating filter onto the image forming member, and a lens for enlarging and projecting the object image onto a projection screen being incident to the reflection member.

To further accomplish the above objects, there is also provided an overhead projector including a base plate whereon an object is placed, a support extended upward from one side of the base plate, a first optical source installed on the support on the base plate and which irradiates light onto the object at a predetermined angle, a focusing lens group for focusing the light reflected from the object which was irradiated from the first optical source onto the object, a second optical source for irradiating illuminance light at a right angle with respect to the optical axis of the focusing lens group, the illuminating light having a wisible light component and a specific wavelength component, a filter for passing a specific wavelength of the reflected light being incident from the focusing lens group and for reflecting the visible light component of the light irradiated from the second optical source coaxially with the specific wavelength of the light reflected from the object, a first light-shielding film installed coaxially with the second optical source and which emits and shields the light reflected from the object and not passed through the filter and the specific wavelength component of the light irradiated from the second optical source which passes through the filter, an image forming member installed on the filter and which reacts photosensitively by the filtered specific wavelength of the light reflected from the object so as to form an image corresponding to the object, a reflection mirror installed on the image forming member so as to reflect an image, a projection lens for enlarging and projecting the image of the object onto the entire surface of the reflection mirror, and a head fixed on one end of the support and which includes a second light-shielding film installed about the projection lens in order to shield the specific wavelength introduced from the outside.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

Figure 1:
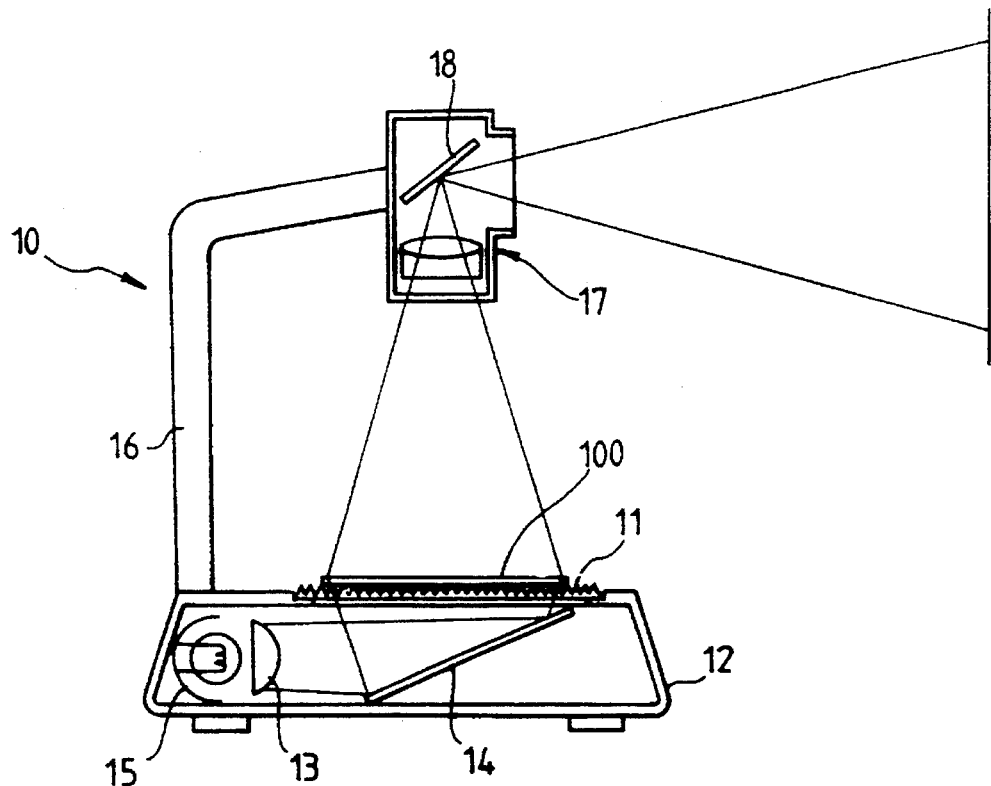
FIG. 1 is a schematic elevation view showing a conventional overhead projector.
Figure 2:
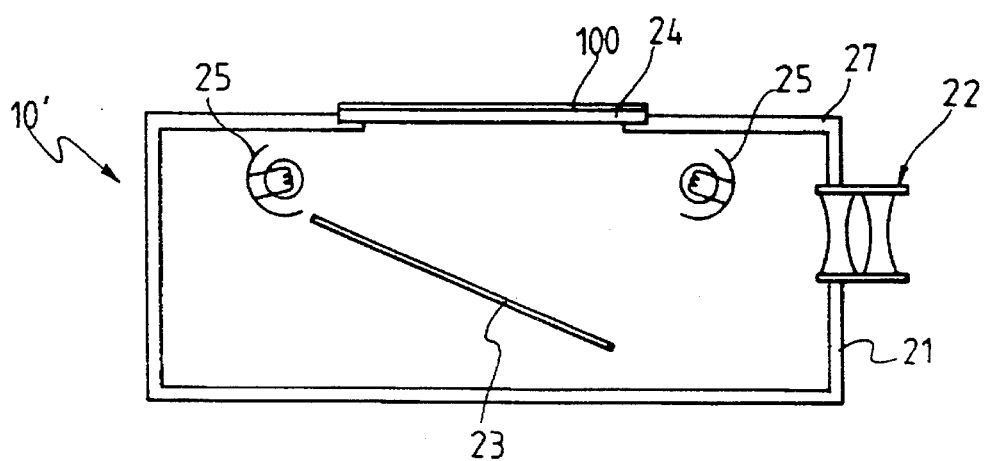
FIG. 2 is a schematic elevation view showing another embodiment of a conventional overhead projector.
Figure 3:
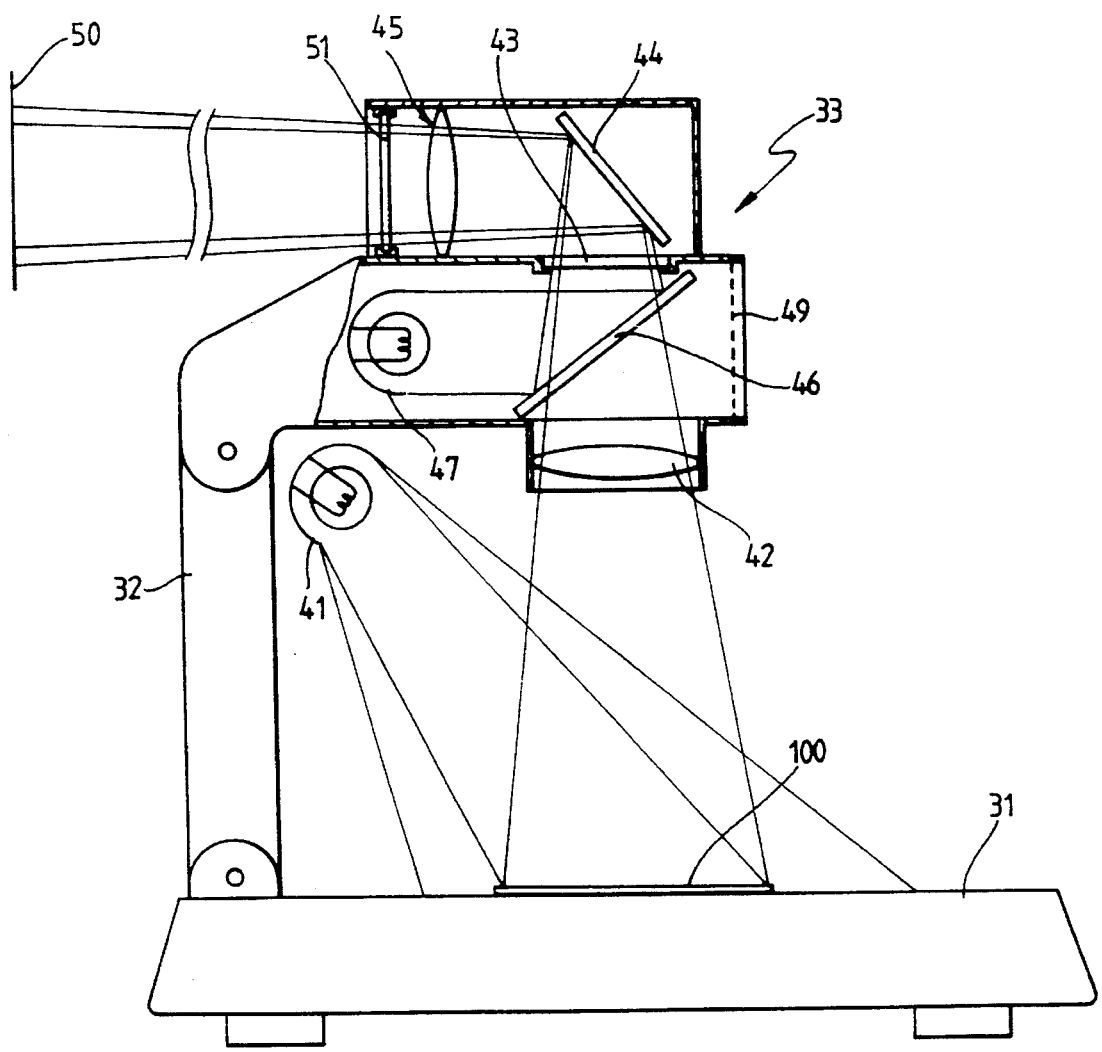
FIG. 3 is a side elevation view partly in section showing an overhead projector of the present invention.

An overhead projector of the present invention focuses light reflected from an object by means of irradiating light having a predetermined wavelength onto the object placed on a planar surface, irradiating the light having a specific wavelength among the focused light onto an image forming means so as to form a first image, and enlarging and projecting the image onto a projection screen by employing visible light. As shown in FIG. 3, a support 32 is installed on one side of a base plate 31 and a head 33 located vertically with respect to base plate 31 is coupled to one end of support 32. A first optical source 41 is installed on an upper end of support 32 for irradiating a specific wavelength onto a paper or an object located on baseplate 31. A focusing lens group 42 for focusing the light irradiated from the first optical source 41 onto and reflected from the object 100, is installed in head 33 located above the object 100 placed on base plate 31. Coaxially with focusing lens 42, an image forming member 43 where color is changed by the light having a specific wavelength and a reflection mirror 44 for reflecting the light at a right angle are installed at predetermined intervals. A projection lens group 45 for focusing and diffusing the light reflected from reflection mirror 44 so as to project the result onto projection screen 50 is installed about reflection mirror 44 as illustrated in FIG. 3. A filter 46 is installed between focusing lens group 42 and image forming member 43, for passing that portion of the light reflected from object 100 having a specific wavelength and reflecting the remaining portion of the light reflected from object 100 not having the specific wavelength, so that only the light having a specific wavelength can be irradiated onto image forming member 43. In addition, second optical source 47 is installed about filter 46 for irradiating the light onto filter 46 in a direction forming a right angle with respect to an optical axis of focusing lens 42. Filter 46 passes a specific wavelength of the light irradiated from second optical source 47, and reflects the visible light coaxially with the specific wavelength irradiated from first optical source 41 and passed through the filter 46. Accordingly, as filter 46 is used for filtering the light passed through focusing lens group 42 and for filtering the light irradiated from second optical source 47.

Here, image forming member 43 is manufactured by coating a photo-sensitive polymer on a transparent plate, and a halogen lamp is employed as the second optical source 47. A second light shielding film 51, for shielding the specific wavelength in order to prevent projection lens group 45 from being penetrated by the ultraviolet from the outside, is installed about projection lens group 45 as illustrated in FIG. 3. A first light shielding film 49 for shielding by means of emitting the light except those who have a specific wavelength and the light having the specific wavelength that passed filter 46 from optical source 47, is installed behind the filter coaxially with respect to the scanning direction of second optical source 47.

Infrared or ultraviolet radiation is used as the light having a specific wavelength that can pass through filter 46 among the reflected light irradiated from first optical source 41 onto the object 100 on base plate 31. The image forming member 43 forms an image corresponding to the object 100 by a photo-sensitive reaction that employs infrared or ultraviolet radiation, i.e., light having a specific wavelength reflected from the object 100 and focused by the focusing lens 42.

An overhead projector according to the present invention operates as follows.

In order to project the image of an object or that of paper 100 onto projection screen 50 by employing an overhead projector of the present invention, paper 100 (or an object) is placed on base plate 31. Then, light is irradiated onto the surface of the paper 100 by employing first optical source 41. Thus, the light irradiated onto and reflected from the paper 100 is focused by focusing lens group 42 and the ultraviolet radiation or infrared rays having a specific wavelength contained in the reflected light pass through filter 46. The light reflected from paper 100, except the ultraviolet radiation or infrared rays having the specific wavelength, is again reflected to first light shielding film 49 while ultraviolet or infrared radiation is passed through filter 46. The filtered ultraviolet or infrared rays are irradiated onto image forming member 43. Accordingly, the color of image forming member 43 changes by the ultraviolet and infrared radiation, and thus, the image of the object or the contents of the sheet of paper 100 is formed.

When an image is thus formed on image forming member 43, the ultraviolet or infrared rays among the light irradiated from second optical source 47 to filter 46 pass through filter 46 and are emitted to first light shielding film 49. The visible light (not comprising the ultraviolet or infrared rays) irradiated from second optical source 47 is reflected by filter 46 and irradiated onto image forming member 43. Thus, the image formed on image forming member 43 is projected onto projection screen 50 via reflection mirror 44 and projection lens group 45. Thus, an image of the paper 100 is clearly projected onto projection screen 50. In more detail, an image is formed initially onto image forming member 43 by the ultraviolet or infrared rays irradiated from first optical source 41 to the paper's surface 100 and reflected therefrom. Then, the image formed on image forming member 43 is projected onto projection screen 50 by the visible light irradiated from second optical source 47. Thus, image resolution can be improved.

In the embodiment of the present invention, forming a projected image is explained by employing ultraviolet or infrared rays. However, such an image can also be formed by employing X-rays.

As described above, an overhead projector of the present invention can project the image of an object or the contents of a sheet of paper directly onto a projection screen. Therefore, an additional film for use in a projector is not needed and three-dimensional objects can be projected as well.

What is claimed is:

1. An overhead projector comprising:

first illuminating means for irradiating light having a predetermined wavelength onto an object placed on a planar surface;

focusing means for focusing the light irradiated by said first illumination means and reflected from the object;

first isolating means for passing a specific wavelength of the light being incident from said focusing means, and for reflecting the light not having the specific wavelength at a predetermined angle;

image forming means for forming an image of the object by a photosensitive reaction by employing the light having a specific wavelength and which has passed said first isolating means;

second illuminating means for irradiating illuminance light, said illuminance light having a visible light component which is irradiated onto said image forming means at a predetermined angle;

second isolating means for irradiating the visible light component of the illuminance light irradiated from said second illuminating means onto said image forming means, and for removing the specific wavelength component of said illuminance light;

reflection means for reflecting the image onto which the visible light component irradiated from said second isolating means onto said image forming means is projected at a predetermined angle; and means for enlarging and projecting the object image onto a projection screen, said enlarging and projecting means being incident to said reflection means.

2. An overhead projector according to claim 1, wherein said object is printed on paper.

3. An overhead projector according to claim 1, wherein said object is three-dimensional.

4. An overhead projector according to claim 1, wherein the specific wavelength irradiated by said first illumination means is in the ultraviolet band, and said image forming means photo-sensitively reacts with ultraviolet wavelengths.

5. An overhead projector according to claim 1, wherein the specific wavelength irradiated by said first illumination means is in the ultraviolet band, and said image forming means is photo-sensitively reacted by said ultraviolet wavelength so as to form an image corresponding to the object.

6. An overhead projector according to claim 1, wherein said second illumination means employs a halogen lamp.

7. An overhead projector according to claim 1, wherein a photo sensitive polymer is coated onto the surface of a transparent glass of said image forming means so that an image of the object can be formed by changing the color of said image forming means when the light having a specific wavelength is irradiated.

8. An overhead projector according to claim 1, further comprising light shielding means for emitting and shielding the light not of the specific wavelength being isolated by and reflected from said first isolating means and the light having the specific wavelength being isolated by said second isolating means.

9. An overhead projector according to claim 1, wherein the entire surface of the projection means is introduced to the light of the specific wavelength from the outside.

10. An overhead projector comprising:

a base plate whereon an object is placed;

a support extended upward from one side of said base plate;

a first optical source positioned on the support on said base plate and which irradiates light onto the object at a predetermined angle;

a focusing lens group for focusing the light reflected from the object which was irradiated from said first optical source onto the object;

a second optical source for irradiating illuminating light at a right angle with respect to the optical axis of the focusing lens group, said illuminating light having a visible light component and a specific wavelength component;

a filter for passing a specific wavelength of the reflected light from said object being incident from said focusing lens group and for reflecting the visible light component of the light irradiated from said second optical source coaxially with the specific wavelength of the light reflected from said object;

a first light-shielding film positioned coaxially with said second optical source and which emits and shields the light reflected from said object and not passed through said filter and the specific wavelength component of the illuminating light irradiated from said second optical source which pass through said filter;

an image forming member positioned above said filter along the optical axis of the focusing lens group and which reacts photo-sensitively by the filtered specific wavelength of the light reflected from said object so as to form an image corresponding to the object;

a reflection mirror positioned above said image forming member along the optical axis of the focusing lens group so as to reflect an image;

a projection lens for enlarging and projecting the image of the object from the entire surface of said reflection mirror; and a head fixed on one end of said support and which includes a second light-shielding film positioned about the projection lens in order to shield the specific wavelength introduced from the outside.

11. An overhead projector according to claim 1, wherein said object is an image printed on paper.

12. An overhead projector according to claim 10, wherein said specific wavelength is in the ultraviolet band and irradiated from said first optical source, and said image forming member reacts photosensitively by ultraviolet radiation.

13. An overhead projector according to claim 10, wherein said specific wavelength is in the infrared band and irradiated from said first optical source, and said image forming member reacts photosensitively by infrared rays.

14. An overhead projector according to claim 10, wherein said second optical source is a halogen lamp.

15. An overhead projector according to claim 10, wherein a photo sensitive polymer is coated onto the surface of a transparent glass of said image forming member so that an image corresponding to the object can be formed by changing the color of said image forming member when the light having a specific wavelength is irradiated onto the photo sensitive polymer.

16. An overhead projector according to claim 4, wherein a photo sensitive polymer is coated onto a surface of a transparent glass of said image forming means so that an image of the object can be formed by changing the color of said image forming means when the light having a specific wavelength is irradiated.

17. An overhead projector according to claim 5, wherein a photo sensitive polymer is coated onto a surface of a transparent glass of said image forming means so that an image of the object can be formed by changing the color of said image forming means when the light having a specific wavelength is irradiated.

* * * * *